(12) United States Patent
Noguchi

(10) Patent No.: US 7,234,728 B2
(45) Date of Patent: Jun. 26, 2007

(54) AIRBAG SYSTEM

(75) Inventor: Atsushi Noguchi, Moriyama (JP)

(73) Assignee: Takata Corporation, Tokyo (JP)

( * ) Notice: Subject to any disclaimer, the term of this patent is extended or adjusted under 35 U.S.C. 154(b) by 336 days.

(21) Appl. No.: 10/964,657

(22) Filed: Oct. 15, 2004

(65) Prior Publication Data

US 2005/0104345 A1    May 19, 2005

(30) Foreign Application Priority Data

Nov. 19, 2003 (JP) ............... 2003-389823

(51) Int. Cl.
*B60R 21/213* (2006.01)
*B60R 21/237* (2006.01)

(52) U.S. Cl. ............... 280/730.2; 280/743.1

(58) Field of Classification Search ........... 280/730.2, 280/743.1, 743.2; 493/243, 244, 405, 451, 493/458, 940; *B60R 21/21, 21/213, 21/237*
See application file for complete search history.

(56) References Cited

U.S. PATENT DOCUMENTS

| | | | | |
|---|---|---|---|---|
| 6,237,938 B1 * | 5/2001 | Boxey | ............. | 280/730.2 |
| 6,371,512 B1 | 4/2002 | Asano et al. | | |
| 6,464,250 B1 * | 10/2002 | Faigle et al. | ............. | 280/730.2 |
| 6,474,678 B1 * | 11/2002 | Boxey | ............. | 280/728.2 |
| 6,783,152 B2 | 8/2004 | Tanase et al. | | |
| 6,866,293 B2 | 3/2005 | Ogata | | |
| 7,044,500 B2 * | 5/2006 | Kalandek et al. | ......... | 280/730.2 |
| 2002/0096864 A1 | 7/2002 | Asano et al. | | |
| 2002/0158450 A1 | 10/2002 | Hoeft et al. | | |
| 2002/0158451 A1 | 10/2002 | Nusshor | | |
| 2004/0075256 A1 | 4/2004 | Klaiber et al. | | |

FOREIGN PATENT DOCUMENTS

| | | |
|---|---|---|
| JP | 2003-54351 A | 2/2003 |
| JP | 2003200809 A | 7/2003 |
| JP | 2004-67045 A | 3/2004 |
| WO | WO02/085674 A2 | 10/2002 |

* cited by examiner

*Primary Examiner*—Paul N. Dickson
*Assistant Examiner*—Laura B. Freedman
(74) *Attorney, Agent, or Firm*—Foley & Lardner LLP

(57) ABSTRACT

An airbag system includes a vehicle airbag, which is mounted to an upper part of a sidewall of a vehicle, and an inflator for supplying inflating gas to the vehicle airbag. The vehicle airbag includes a rolled portion wound in a roll, a folded portion inside the roll, and bellows portions provided to ends of the rolled portion adjacent to a base end of the airbag and adjacent to a distal end of the airbag. The bellows portions being folded like a bellows. The airbag is configured to be inflated downward into an occupant protection region between an occupant and a sidewall of the vehicle to protect the occupant in the event of a car accident. The rolled portion is wound such that the projection of the folded portion faces the vehicle sidewall when the airbag is inflated.

8 Claims, 7 Drawing Sheets

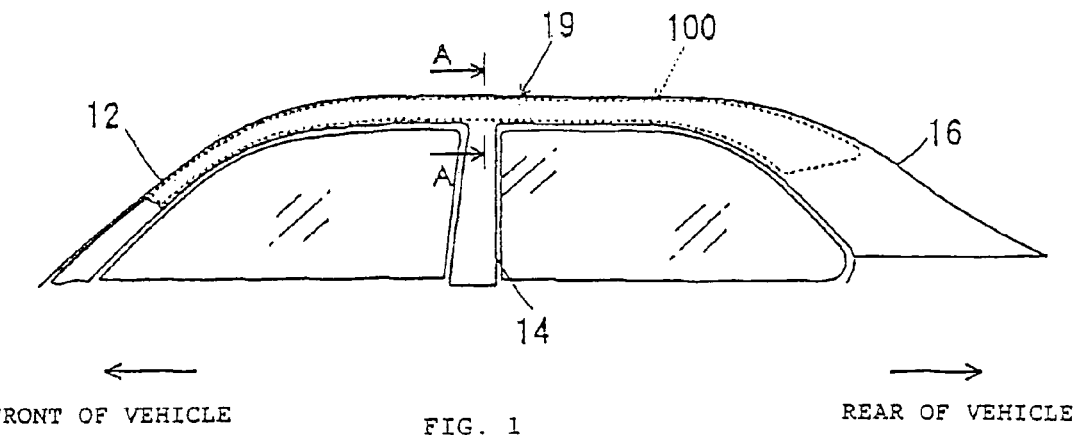
FRONT OF VEHICLE    FIG. 1    REAR OF VEHICLE
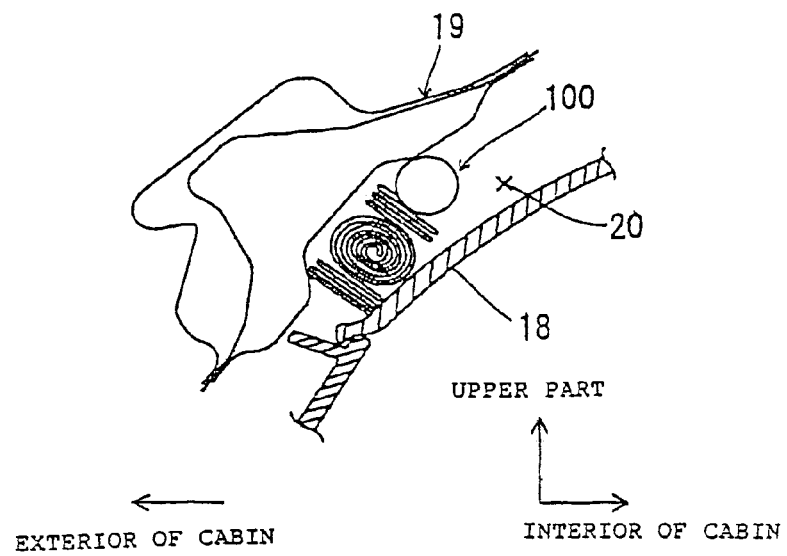
EXTERIOR OF CABIN    INTERIOR OF CABIN
FIG. 2

AIRBAG SYSTEM

BACKGROUND

The present invention relates to an airbag system to be mounted to a vehicle such as a car. More particularly, it relates to a technique for constructing an airbag system for protecting an occupant from colliding with the sidewall of a vehicle in the event of a car accident such as a side collision or rolling.

Various techniques for constructing an airbag system have been proposed that protect an occupant from colliding with the sidewall of a vehicle such as a side window or a door in the event of a car accident such as a side collision or rolling. For example, it is known in the art to provide an airbag system having a vehicle airbag accommodated along the side roof rail; in such systems, the airbag is folded in a roll.

One example of such a conventional system is disclosed in Japanese Unexamined Patent Application Publication No. 2003-200809 (incorporated by reference herein) that discloses a technique of inflating and deploying a vehicle airbag smoothly by folding the vehicle airbag in a roll. However, in the conventional systems, further technical research has been necessary to achieve a high-level technique of inflating and deploying the vehicle airbag both quickly and accurately into an occupant protection region between the vehicle sidewall and an occupant.

SUMMARY

The present invention has been made in view of the above problems. Accordingly, it is an object of at least one embodiment the present invention to provide a technique of constructing an airbag system for completely and efficiently protecting an occupant in the event of a car accident. The present invention is also applicable to the structure of an airbag system to be mounted to various vehicles including automobiles, trains, and vessels.

An embodiment of an airbag system according to the present invention includes at least a vehicle airbag and gas supply means such as, for example, an inflator having a gas generating function. The vehicle airbag is mounted to the upper part of the sidewall of a vehicle and has the function of inflating downward into an occupant protection region between an occupant and the vehicle sidewall to protect the occupant in the event of a car accident such as a side collision or rolling of the vehicle. Inflating gas is supplied to the vehicle airbag through the gas supply means. The "vehicle sidewall" in this case includes the components of the vehicle located on the side (right or left) of an occupant in a broad sense, typically, a side window and a door. The vehicle airbag is typically mounted to the boundary between a side roof panel and a ceiling panel at the upper part of the vehicle sidewall.

The vehicle airbag has a folded structure in which a rolled portion and bellows portions are combined; the bellows portions are disposed at the ends of the rolled portion adjacent to a base end and a distal end of the airbag. In other words, in an vehicle airbag folded so as to have bellow portions, the interval from the base end of the airbag to the distal end is partially replaced with a rolled portion.

The rolled portion is wound in a roll (i.e., folded) and has a folded portion inside the roll, possibly in the center of the roll. The rolled portion is effective in accurately inflating the vehicle airbag in the occupant protection region to offer a high protection effect. Accordingly, it is preferable to construct the rolled portion to inflate accurately into the region that is to be protected, such as the head of the occupant.

The bellows portions, which are folded like a bellows, are effective in quickly inflating the vehicle airbag in an occupant protection region. Since the airbag has a bellows portion, a rolled portion, and a second bellows portion disposed in this order (from the base end of the airbag toward the distal end), the vehicle airbag can be accurately inflated in the occupant protection region. Moreover, the entire vehicle airbag can be inflated quickly from the base end thereof to the distal end. In contrast to conventional airbags, these operational benefits are difficult to obtain in a conventional airbag structure in which the bellow portion is simply disposed at the base end of the airbag and the rolled portion at the distal end.

Furthermore, the rolled portion of the vehicle airbag is wound in a roll such that a projection of the inflated folded portion faces the vehicle sidewall. When the rolled portion inflates, the projection of the folded portion unrolls toward the vehicle sidewall. Accordingly, the rolled portion is effective in maintaining a smooth inflation of the vehicle airbag because it prevents the folded portion from being caught by an occupant in the process of inflation.

In light of the foregoing, as a result of the rolled portion and the bellows portions being preferably combined in the vehicle airbag and as a result of the unrolling of the rolled portion, the vehicle airbag can be inflated accurately and smoothly in the occupant protection region. Moreover, the entire vehicle airbag can be inflated quickly from the base end thereof to the distal end.

In another embodiment of the invention, the region in which the rolled portion of the vehicle airbag inflates and the number of such regions can be varied as necessary. For example, the airbag system can be constructed such that the rolled portion inflates in a region corresponding to a first part of the occupant to be protected and in a region corresponding to a second part, e.g. the head, of the occupant.

In another embodiment of the invention, the rolled portion of the vehicle airbag may be constructed to inflate while deploying in a region of the occupant protection region corresponding to the head of the occupant. This embodiment ensures not only that the vehicle airbag inflates accurately and smoothly in the region of the occupant protection region corresponding to the head of an occupant but also that the entire vehicle airbag inflates quickly from the base end thereof to the distal end.

According to an embodiment the invention, the vehicle airbag is constructed such that (a) a rolled portion and bellows portions are combined, in which the bellows portions are disposed at the ends of the rolled portion adjacent to the base end of the airbag and adjacent to the distal end and (b) the rolling and unrolling states of the rolled portion achieves a high-level technique of inflation that is both quick and accurate in the occupant protection region between the vehicle sidewall and the occupant.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a schematic diagram of the placement of an embodiment of airbag system in a vehicle according to the present invention;

FIG. 2 is a cross-sectional view of a center pillar (i.e., B-pillar) taken along line A—A of FIG. 1;

DETAILED DESCRIPTION

Figure 3:
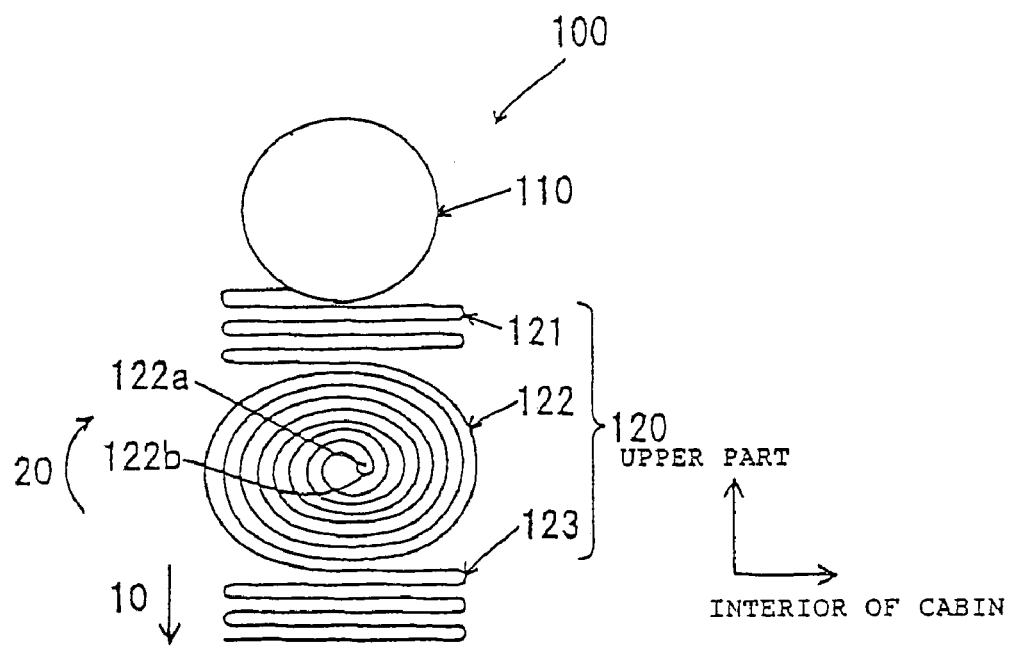
FIG. 3 is a schematic diagram of the airbag system of FIG. 2.

Embodiments of the present invention will be specifically described hereinafter with reference to the drawings. With respect to FIGS. 1 to 6, the structure and operation of an embodiment of an airbag system 100 according to the present invention will be described. In FIGS. 1 to 6, the airbag system 100 to be mounted to the body of a car will be described by way of example with respect to the right side of the vehicle.

FIG. 1 schematically shows an airbag system 100 mounted to a vehicle body. FIG. 2 is a cross-sectional diagram taken along line A—A of FIG. 1, showing the cross section of a center pillar (i.e., B-pillar) 14. FIG. 1 shows the front of the vehicle on the left and the rear of the vehicle on the right. The airbag system 100 in FIG. 2 is in a state before operation (i.e., in an initial, non-inflated state). FIG. 2 shows the right wall of the vehicle, in which the interior of the cabin is on the right and the outside of the cabin is on the left.

As shown in FIGS. 1 and 2, the airbag system 100 is disposed in a region 20 demarcated by a ceiling panel 18 and a right side roof rail (i.e., vehicle body panel) 19. The airbag system 100 extends along the extending direction of the right side roof rail 19 from a front pillar (i.e., A-pillar) 12 to a rear pillar (i.e., C-pillar or D-pillar) 16. Briefly, the airbag system 100 and an airbag 120, to be described later, are mounted to the upper part of the vehicle sidewall.

FIG. 3 is a schematic diagram of the airbag system 100 of FIG. 2. The airbag system 100, which will be specifically described later, particularly has the function of protecting an occupant quickly and reliably in the event of a car accident such as a side collision or rolling. FIG. 3 shows the airbag system 100 to be accommodated in the wall of the vehicle, showing the interior of the cabin on the right.

As shown in FIG. 3, the airbag system 100 is principally constructed of the airbag 120 accommodated in a folded state in a predetermined shape and an inflator (also referred to as a gas generator) 110 which can generate inflating gas that is supplied into the space in the airbag 120, i.e., the inflator 10 serves as a gas supply means.

When the airbag system 100 is mounted in the vehicle body, the airbag 120 is disposed such that the base end (adjacent to the inflator 110) is located nearly at the upper part and the distal end is located nearly at the lower part. The airbag 120 is fixed to the right side roof rail 19 via brackets 127, to be described later.

The inflator 110 is connected to the airbag 120 so as to supply inflating gas into the space in the airbag 120. The airbag 120 has a hybrid folded structure in which bellows portions, which are folded like bellows (i.e., like an accordion), and a rolled portion, which is wound (i.e., folded) in a roll, are combined.

Specifically, a first bellows portion 121, a rolled portion 122, and a second bellows portion 123 are disposed in this order from the base end of the airbag 120 toward the distal end. In other words, of the vehicle airbag constructed of bellows, the interval from the base end of the airbag to the distal end is partially replaced with the rolled portion 122.

The rolled portion 122 is rolled in the direction of arrow 20 in FIG. 3 and has a folded portion 122a inside the roll that may be in the center of the roll. As hereinafter described in detail, this airbag system 100 embodiment is constructed such that when the airbag 120 is inflated: (a) the rolled portion 122 is located in a region of an occupant protection region that corresponds to the head C of an occupant; (b) the first bellows portion 121 is located above the head C of the occupant; and (c) the second bellows portion 123 is located below the head C of the occupant.

The rolled portion 122 of this embodiment is set to be wound into a roll such that a projection 122b of the folded portion 122a faces the sidewall of the vehicle (side window etc.) during inflation. By such setting of the rolled portion 122, the projection 122b of the folded portion 122a is rolled out toward the vehicle sidewall (i.e., away from the occupant) during inflation, as shown in FIG. 4.

Figure 4:
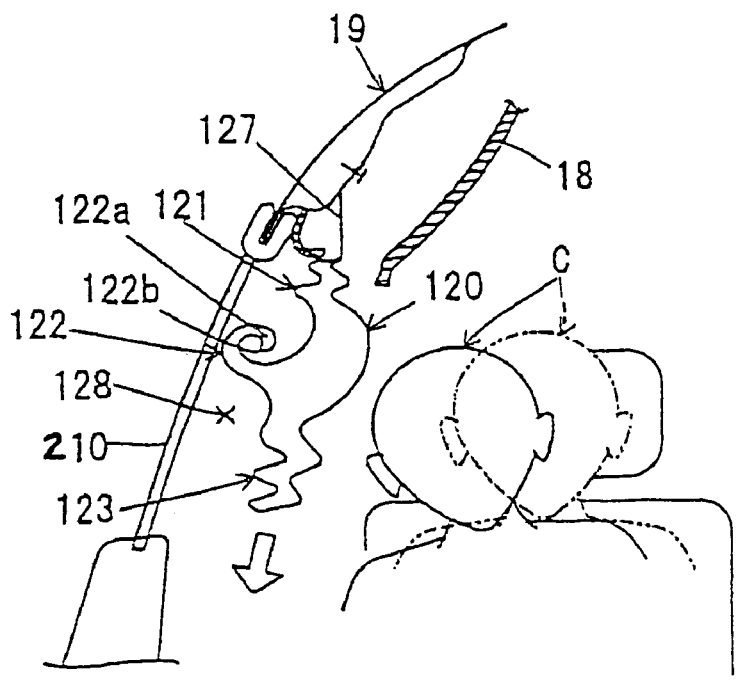
FIG. 4 is a diagram of the airbag of FIG. 3 in the process of inflation as viewed from the front of the vehicle.
Figure 5:
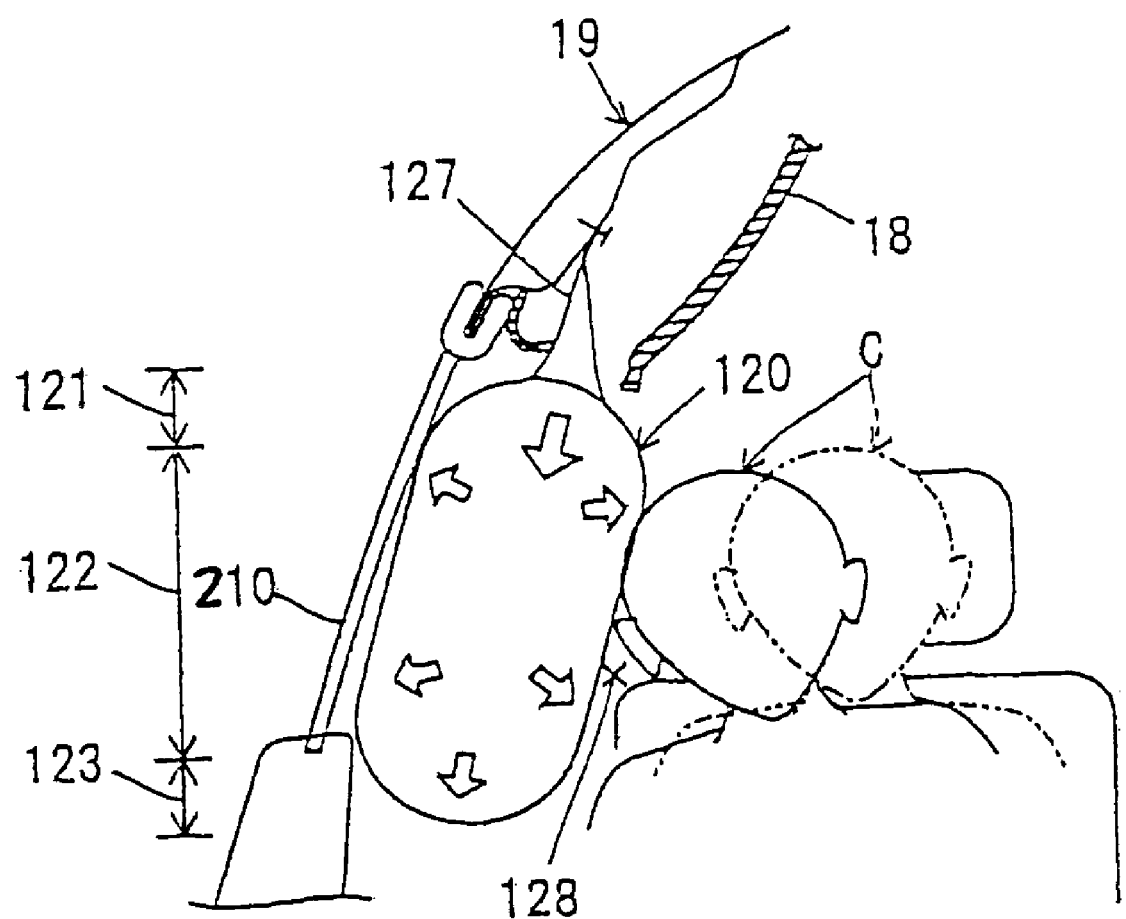
FIG. 5 is a diagram of the airbag of FIG. 3 at the completion of the inflation process as viewed from the front of the vehicle.
Figure 6:
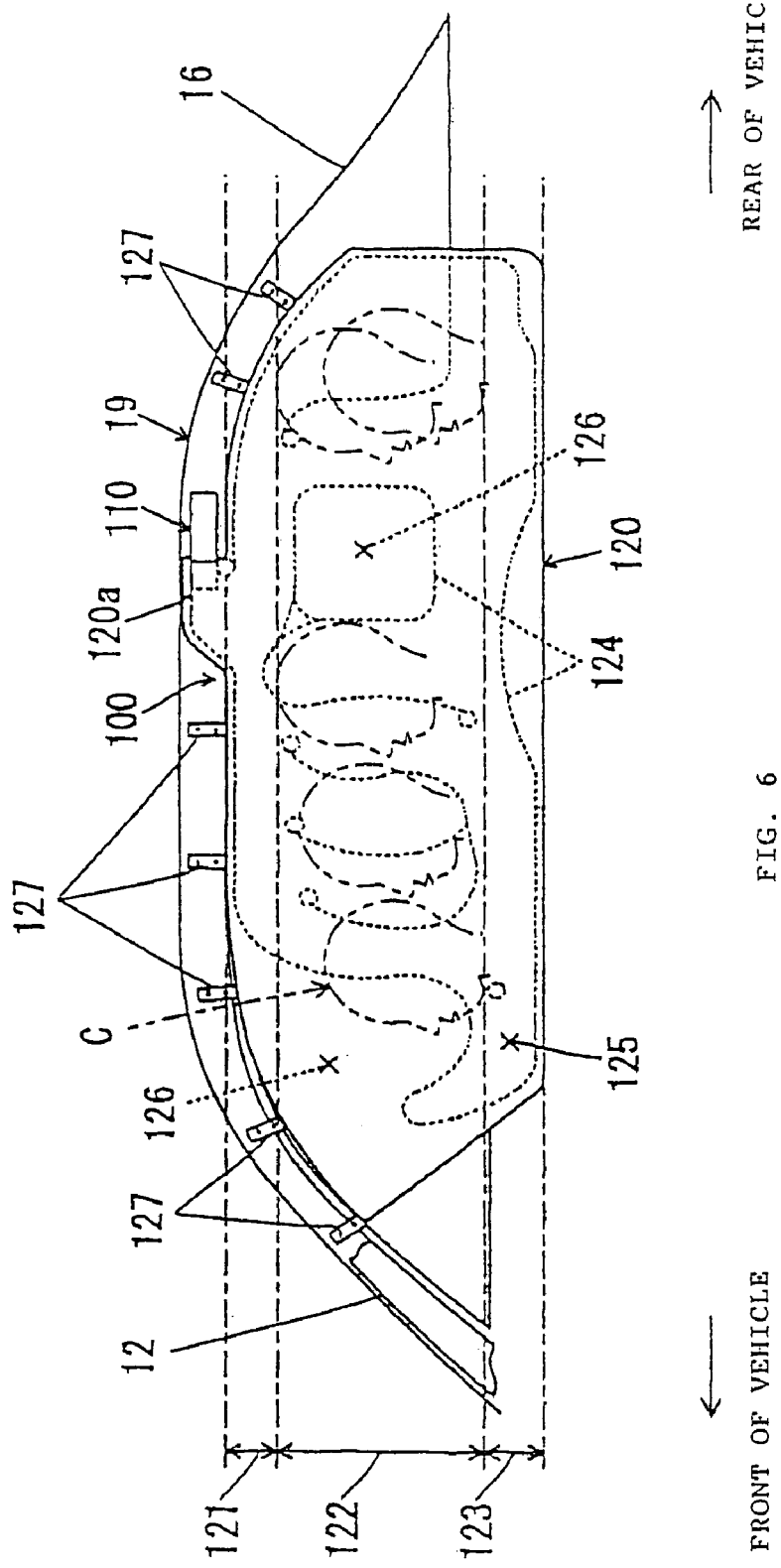
FIG. 6 is a diagram of the airbag of FIG. 3 at the completion of the inflation process as viewed from the side of the vehicle.

Referring now to FIGS. 4 to 6, the action of the airbag system 100 with the above-described structure will be described. FIG. 4 is a diagram of the airbag 120 in FIG. 3 in the process of inflation as viewed from the front of the vehicle. FIG. 5 is a diagram of the airbag 120 in FIG. 3 at the completion of the inflation process as viewed from the front of the vehicle. FIG. 6 is a diagram of the airbag 120 in FIG. 3 at the completion of the inflation process as viewed from the side of the vehicle. FIGS. 4 and 5 show the location of the head C of an occupant before the occurrence of the side collision (or a rolling of the vehicle) by a two-dot chain line and the location of the head C of the occupant when the side collision (or rolling of the vehicle) occurs by a solid line.

When a side collision (or rolling of a vehicle) occurs, the airbag system 100, which was in an initial state shown in FIG. 2, is activated to emit inflating gas from the inflator 110. The gas is supplied into the space in the airbag 120. As shown in FIG. 4, as the inflator 110 operates, the airbag 120 starts a deploying and inflating action to push the ceiling panel 18 open to inflate while deploying downward toward an occupant protection region 128 between the right sidewall (i.e., side window 210) and the head C of the occupant.

The first bellows portion 121, the rolled portion 122, and the second bellows portion 123 inflate while deploying in the occupant protection region 128 in the process of deploying inflation of the airbag 120. The occupant protection region 128 is a protection region formed between the head C of the occupant and the vehicle sidewall.

In this embodiment, the bellows portions 121, 123 are disposed at the base end and the distal end of the airbag 120, with the rolled portion 122 interposed therebetween. As a result, the entire airbag 120 inflates while deploying quickly from the upper part of the vehicle toward the lower part (i.e., in the direction of arrow 10 in FIG. 3). Thus, the folded state of the bellows portion is advantageous to release the folded state, thereby inflating while deploying quickly in a short time.

This embodiment uses the rolled portion 122, which is folded in a roll, of the airbag 120 to protect the head C of the occupant. Accordingly, the airbag 120 can be accurately inflated to deploy in the region of the occupant protection region 128 corresponding to the head C of the occupant, providing a high protection effect. Moreover, the rolled portion 122, which corresponds to the head C of the occupant, is constructed such that the projection 122*b* of the folded portion 122*a* faces the sidewall of the vehicle during inflation. This prevents the folded portion 122*a* of the rolled portion 122 from being caught by the head C of the occupant in the process of inflation, thereby maintaining smooth inflation of the airbag 120.

While the rolled portion is effective in enhancing the protection of the occupant, a bellows portion is more effective than the rolled portion in inflating the airbag quickly. Therefore, it is preferable to limit the region to be protected by the rolled portion 122 to a minimum required range such as that which corresponds to the head C of the occupant.

Thus, as shown in FIGS. 5 and 6, the airbag 120 inflates while deploying quickly and accurately into a space (i.e., the occupant protection region 128 in FIG. 5) between the right sidewall (i.e., side window 210) and the head C of the occupant, with the top supported by the right side roof rail 19 via the multiple brackets 127. The airbag 120 inflates in the occupant protection region 128 into a curtain shape that protects a range from the front pillar 12 to the rear pillar 16, that is, a wide range from the position of a front-seat occupant to the position of a rear-seat occupant collectively. The airbag 120 is thus also referred to as what is called a "curtain airbag."

As shown in FIG. 6, the embodiment is constructed such that the vertical length of the rolled portion 122 of the inflated airbag 120 is set to correspond to the positions of the heads of occupants having different body shapes such as heights and sitting heights and the positions of the heads of occupants in different seats such as a front seat and a rear seat. The inflated airbag 120 thus acts to receive and accurately protect the head C of the occupant that moves toward the right sidewall (i.e., side window 210) when a side collision (or rolling of the vehicle) occurs. Thus, the head C of the occupant is completely protected during the side collision (or rolling of the vehicle).

As shown in FIG. 5, the inner space of the airbag 120 may be divided into an inflating portion(s) 125 and a non-inflating portion(s) 126 by a seam 124. Inflating gas supplied through a gas supply port 120*a* is regularly guided to form a desired gas flow into the inner space of the inflating portion(s) 125.

As a result of the rolled portion 122 and the bellows portions 121, 123 being suitably combined in the airbag 120 and as a result of the functionality of the rolled portion 122, the airbag 120 can be inflated accurately and smoothly in the occupant protection region 128. Moreover, the entire airbag 120 can be inflated quickly from the base end thereof to the distal end. This achieves a high-level technique of inflating the airbag 120 so that the airbag is deployed in the occupant protection region 128 between the vehicle sidewall and the occupant quickly and accurately in the event of a car accident and, particularly, protecting the head C of the occupant.

It should be understood that the invention is not limited to the foregoing embodiment but various applications and modifications can be made. For example, the following embodiments to which the aforesaid embodiment is applied can also be made.

Figure 7:
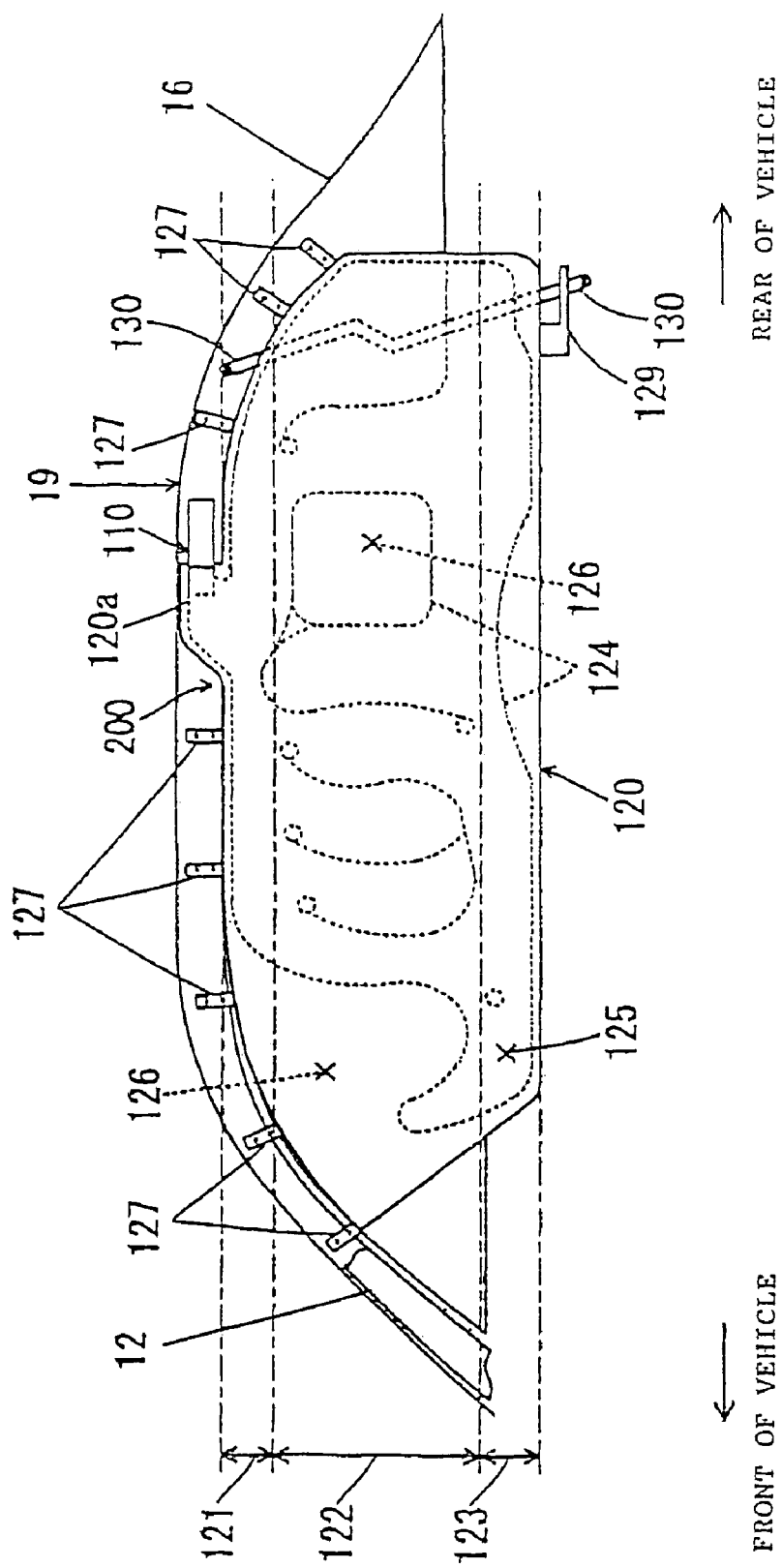
FIG. 7 is a diagram of another embodiment of an airbag according to the present invention at the completion of the inflation process as viewed from the side of the vehicle.
Figure 8:
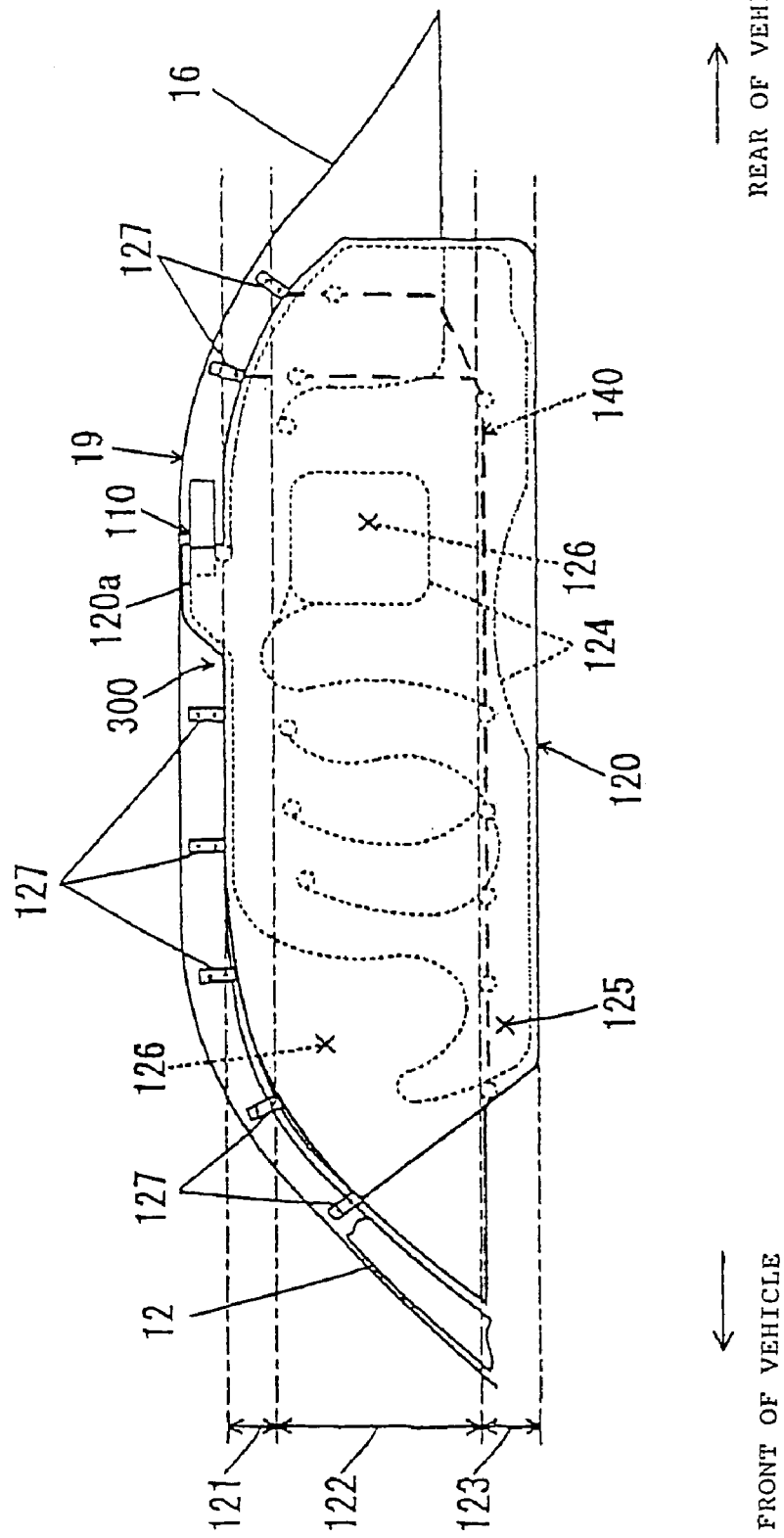
FIG. 8 is a diagram of another embodiment of an airbag according to the present invention at the completion of the inflation process as viewed from the side of the vehicle.

Other airbag system 200, 300 embodiments of the invention are respectively shown in FIGS. 7 and 8. The structures of the airbag systems 200, 300 will be described while using the same reference numbers for like parts shown in the airbag system 100 shown in FIG. 6; a detailed description of the function of the like numbered parts is, therefore, omitted.

The airbag system 200 shown in FIG. 7 includes a guide 130 for guiding the part of the airbag 120 adjacent to the rear of the vehicle from the upper part of the vehicle toward the lower part along the rear pillar 16. The guide 130 is long and fixed to the rear pillar 16. A connecting strap (i.e., tension strap) 129 of the airbag 120 is wound around the guide 130, so that the airbag 120 and the guide 130 are joined together. The connecting strap 129 connected to the guide 130 has the function of preventing (or at least inhibiting) the head of an occupant from being thrown out of the vehicle during a car accident.

The airbag system 300 shown in FIG. 8 includes a wire 140 that supports the inflated airbag 120.

The airbag systems 200 and 300 include an airbag 120 that is folded in the same way as in the previously described airbag system 100. As a result, systems 200, 300 also achieve a high-level technique of inflating an airbag 120 quickly and accurately in the occupant protection region 128 between the vehicle sidewall and the occupant during a car accident and, particularly, protecting the head C of the occupant.

Figure 9:
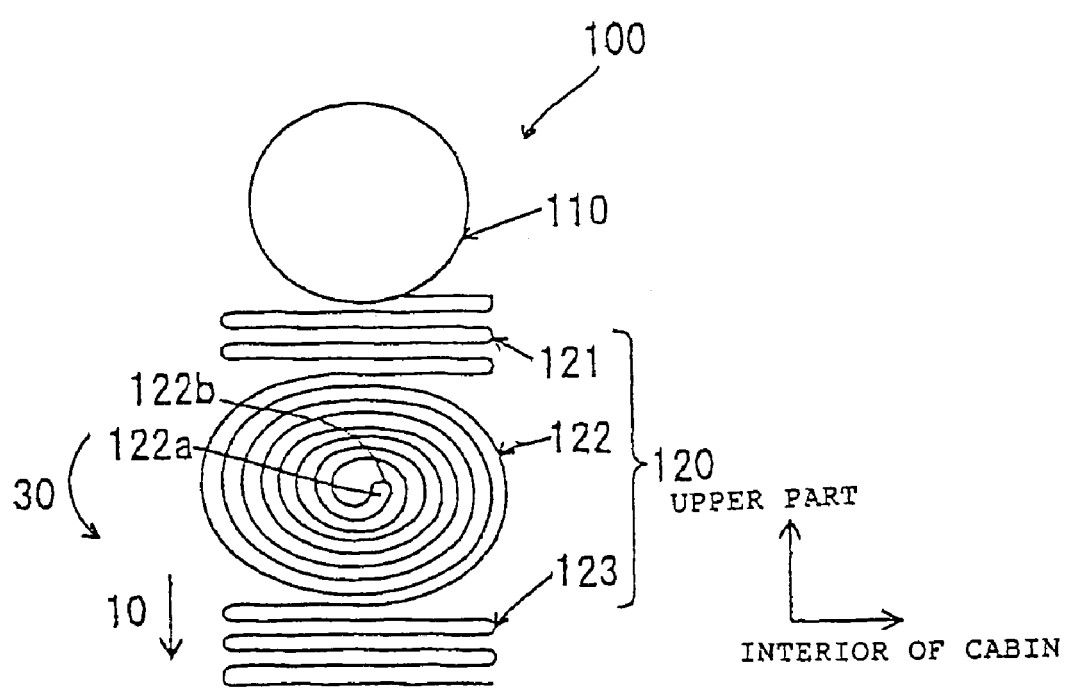
FIG. 9 is a structural diagram of a rolled portion wound in a direction different from the rolling direction shown in FIG. 3.

Although the foregoing embodiments have been described for the case in which the rolled portion 122 is rolled up in the direction of arrow 20 in FIG. 3, another roll structure may be used. FIG. 9 shows the structure of the rolled portion 122 wound up in a direction different from the rolling direction shown in FIG. 3. Specifically, the rolled portion 122 of FIG. 9 is wound in the direction of arrow 30 opposite to that of arrow 20 in FIG. 3. However, even with the rolled portion 122 shown in FIG. 9, the projection 122*b* of the folded portion 122*a* still faces the vehicle sidewall (i.e., side window 210 etc.) during inflation. Moreover, the structure of the rolled portion 122 shown in FIG. 9 can be applied to any of the airbag systems 100, 200, 300.

The airbag systems 100, 200, 300 of the invention may be constructed such that the components of the airbag systems are mounted in sequence. Alternatively, the airbag systems 100, 200, 300 may be modular such that an entire airbag system module may be mounted to (or dismounted from) a vehicle body as a whole.

Although the foregoing embodiments have been described for an airbag 120 that protects a wide range (i.e., from the position of a front seat occupant to the position of a rear seat occupant collectively), the airbag can be divided to multiple parts. For example, the airbag may be divided into a first airbag for protecting a front seat occupant and a second airbag for protecting a rear seat occupant; this structure is effective in inflating the airbags disposed in a divided manner at a desired speed. Moreover, such a multipart structure is particularly effective in a vehicle in which the distance from the front pillar to the rear pillar is long and/or the distance of the occupant protection region along the length of the vehicle is long.

Although the airbag system embodiments described herein were described as being suspended adjacent the right side roof rail 19 to protect the right side of the head C of an occupant, a mirror image shaped airbag system may, of course, be suspended from the left side roof rail to protect the left side of the head C of the occupant.

The priority application, Japanese Patent Application No. JP2003-389823 filed on Nov. 19, 2003, is hereby incorporated by reference herein in its entirety.

Given the disclosure of the present invention, one versed in the art would appreciate that there may be other embodiments and modifications within the scope and spirit of the invention. For example, while the embodiments have been described for the structure of an airbag system to be mounted to a car, the invention can also be applied to the structure of an airbag system to be mounted to vehicles other than cars, such as trains or vessels. Accordingly, all modifications attainable by one versed in the art, upon reading the present disclosure, are within the scope and spirit of the present invention and are to be considered as further embodiments of the present invention. The scope of the present invention is only to be defined as set forth in the following claims.

What is claimed is:

1. An airbag system comprising: a vehicle airbag mounted to an upper part of a sidewall of a vehicle, the vehicle airbag comprising:
    a rolled portion wound in a roll;
    a folded portion inside the roll having an end projection; and
    bellows portions provided to ends of the rolled portion adjacent to a base end of the airbag and adjacent to a distal end of the airbag, the bellows portions being folded like a bellows; and
    wherein the airbag is configured to be inflated downward into an occupant protection region between an occupant and a sidewall of the vehicle to protect the occupant in the event of a car accident, and wherein the rolled portion is wound such that the projection of the folded portion faces the vehicle sidewall when the airbag is inflated.

2. The airbag system according to claim 1, wherein the rolled portion of the vehicle airbag is configured to inflate while deploying in a portion of the occupant protection region corresponding to a head of the occupant.

3. The airbag system according to claim 1, further comprising: a guide configured to guide at least a portion of the airbag provided adjacent a rear of the vehicle from the upper part of the vehicle toward a lower part along a rear pillar.

4. The airbag system according to claim 3, further comprising:
    a connecting strap wound around the guide,
    wherein the strap is configured to inhibit the likelihood of a head of the occupant from exiting the vehicle during a car accident.

5. An airbag system comprising: an airbag mounted to an upper part of a sidewall of a vehicle, the airbag comprising:
    a rolled portion;
    a folded portion inside the rolled portion having an end projection;
    a first bellows portion provided adjacent a base end of the rolled portion; and
    a second bellows portions provided adjacent a distal end of the rolled portion; and
    an inflator for supplying inflating gas to the airbag,
    wherein the bellows portions are folded like a bellows, wherein the airbag is configured to be inflated downward into an occupant protection region between an occupant and a sidewall of the vehicle to protect the occupant in the event of a car accident, and wherein the rolled portion is wound such that the projection of the folded portion faces the vehicle sidewall when the airbag is inflated.

6. The airbag system according to claim 5, wherein the rolled portion of the vehicle airbag is configured to inflate in a portion of the occupant protection region corresponding to a head of the occupant.

7. The airbag system according to claim 5, further comprising:
    a guide configured to guide at least a portion of the airbag provided adjacent a rear of the vehicle from the upper part of the vehicle toward a lower part along a rear pillar.

8. The airbag system according to claim 7, further comprising:
    a connecting strap wound around the guide,
    wherein the strap is configured to inhibit the likelihood of a head of the occupant from exiting the vehicle during a car accident.

* * * * *